3,700,632
READILY EXTRUDED CHLORINATED COPOLYMERS AND PROCESS OF PREPARING SAME
John H. Beale, Wallingford, and William Mayo Smith, Jr., Allentown, Pa., assignors to Air Products and Chemicals, Inc., Philadelphia, Pa.
Filed June 8, 1971, Ser. No. 151,100
Int. Cl. C08f 27/62, 27/03
U.S. Cl. 260—87.5 C
10 Claims

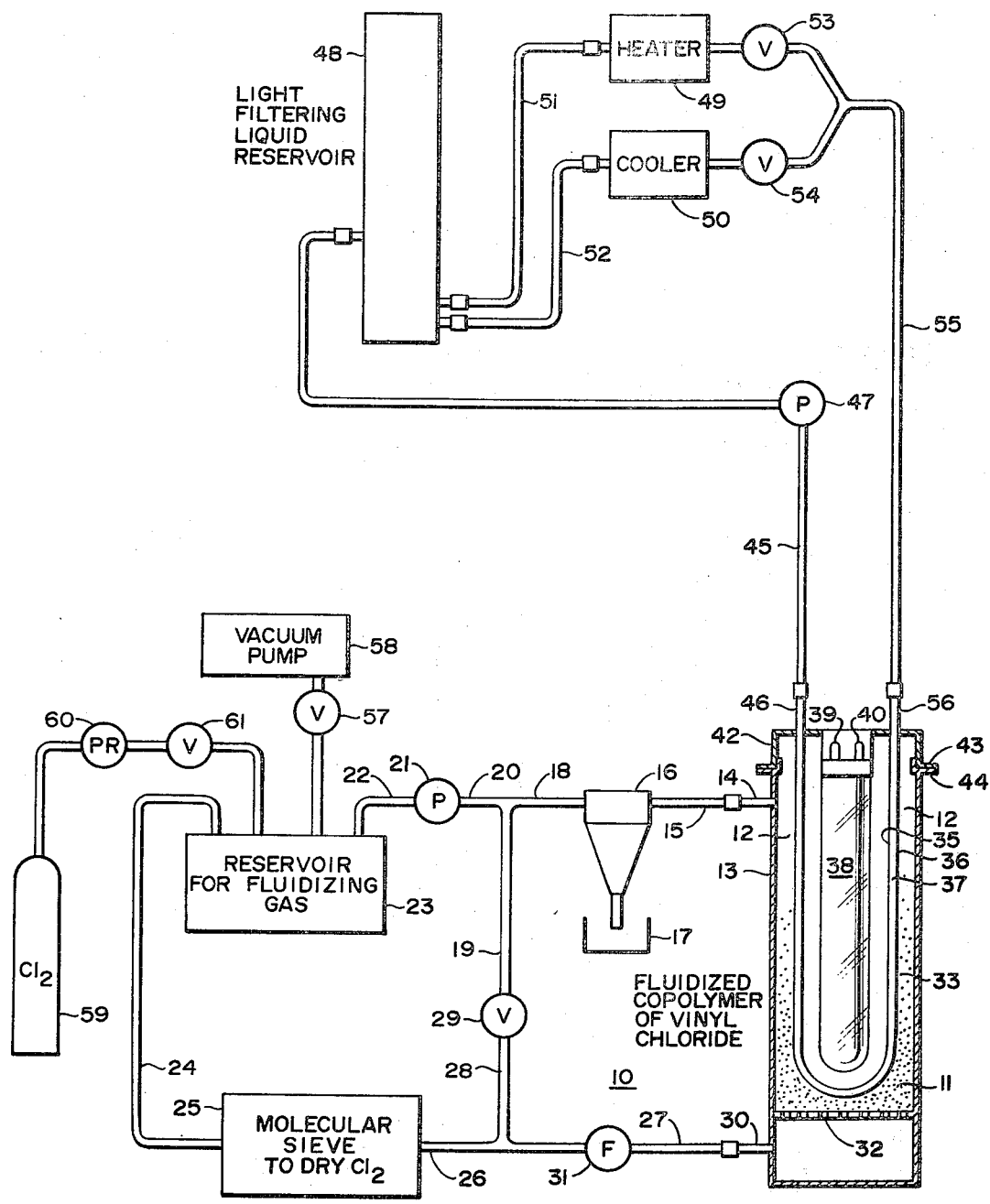

ABSTRACT OF THE DISCLOSURE

Postchlorinated copolymers of vinyl chloride and 2–10% by weight of either isobutylene or a vinyl ether have the advantageous combination of ready extrudability at 190° C. and a Vicat temperature of at least 100° C. The molecular weight of the resin selected as the starting material should be greater than about 10,000, and less than about 50,000, such range being also expressed by values of from about 150 to about 750 for the total number of $C_2$ groups in the polymer. The starting material can be represented by:

in which $m+n=p$, in which $n/p$ is in a range permitting 2–10% by weight of the comonomer. Y is methyl or hydrogen; Q is methyl if Y is methyl; Q is OR if Y is hydrogen, the R being an alkyl group having less than 20 carbon atoms, any chlorine substituents on the R or methyl groups not imparing the R or methyl terminology. The products can be represented as:

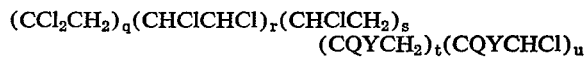

in which $q+r+s+t+u=v$ and $v$ is about equal to $p$ and within the 150–750 range. The Degree of Substitution is 0.3–0.8 so that $s$ is $(0.7-0.2)m$ and $t$ is usually more than $(0.7-0.2)n$. The combination of ready moldability at 190° C. and a Vicat temperature of at least 100° C. is attributed to the relatively large ratio of $r/q$, possibly resulting from the directive influence of $CQYCH_2$ upon the chlorination of $CHClCH_2$, the bulkiness of the Q and Y tending to promote formation of higher than random proportions of CHClCHCl groups during the postchlorination.

FIELD OF INVENTION

This invention concerns the after chlorination of vinyl chloride copolymers, that is, products from chlorination subsequent to polymerization of monomeric precursors containing 2–10% by weight of a member of the group consisting of isobutene and vinyl ethers. The products have the importantly advantageous combination of a Vicat temperature above 100° C. and ready extrudability at about 190° C., thus being superior to some previously described postchlorinated vinyl chloride type resins extrudable only at temperatures such as 220° C. and having propensities to thermally decompose at temperatures below such high extrusion temperatures. A preferred method of postchlorination features light wave activation of chlorination in a fluidized bed of resin particles.

Related features concern: heat transfer means for controlling the temperature of a fluidized chlorination zone; light filtering means for maximizing photoactivation of chlorination; methods of drying fluidizing gas; controlling the temperature of chlorination zone to vary in response to the Degree of Substitution, and methods for post-chlorinating organic polymer particles in an interconnected series of fluidized chlorination zones.

PRIOR ART

Postchlorinated homopolymers of vinyl chloride have been employed for pipes to carry hot water and for other purposes distinguishable from the uses of PVC. Such postchlorinated resins have tended to require very high pressures and/or high temperatures (e.g. 220° C.) for shaping (e.g. extruding, molding, or related converting) the resin. Postchlorinated homopolymers of vinyl chloride have had propensities to thermally decompose near the temperature at which extrusion (hereinafter used as a readily understood example of the shaping techniques comprising molding, extrusion, centrifugal forming, etc.) is feasible on an industrial basis. Postchlorinated resins have been prepared, not merely from PVC, but also from polyethylene, rubber, and polystyrene. Many postchlorination studies have been concerned primarily with achieving a high degree of substitution in the chlorination reaction. The value of 1.00 for the degree of substitution in a PVC type resin has corresponded to the conversion of an average $C_2H_3Cl$ unit to an average $C_2H_2Cl_2$ unit in the polymeric material. Some postchlorinated PVC homopolymers having a high proportion of $CCl_2CH_2$ groups have had Vicat temperatures below 100° C. The increase in Vicat temperature has been one measure of the beneficiation by postchlorination of a PVC type of resin. The higher the molecular weight of the PVC resin, the greater has been the increase in Vicat temperature achieved by postchlorination. Various swelling agents such as chloroform have modified the resin particles (usually dispersed in an aqueous solution) to increase the degree of chlorination. Shockney 3,100,762, Gateff et al. 3,145,190, and Gateff et al. 3,167,535 illustrate prior art particles of postchlorinated PVC type resins. There has been a long standing unsatisfied demand for resins having the combination of: low cost of fabrication of shaped products which has characterized resins consisting predominantly of polyvinylchloride; a Vicat temperature above 100° C.; an adequate safety margin between the temperature of easy extrudability and the temperature of significant thermal decomposition; and a temperature of easy extrudability sufficiently low to avoid need for specialized high temperature equipment.

SUMMARY OF INVENTION

In accordance with the present invention, copolymers of vinyl chloride and 2–10% by weight monomer corresponding to $CQYCH_2$ in which Y is methyl or hydrogen, Q is methyl if Y is methyl, Q is OR if Y is H, the R being an alkyl group having less than 20 carbon atoms, that is, copolymers of 90+% vinyl chloride and an alkyl vinyl ether are the starting material. Particles of such copolymer are chlorinated to provide a degree of substitution within the 0.3 to 0.8 range. The selectivity of the chlorination is surprisingly advantageous, whereby formation of ($CH_2CCl_2$) groups is significantly repressed and formation of (CHClCHCl) groups is promoted, the result possibly being attributable to the bulkiness of the substituents on the minor comonomer. The resulting chlorinated resin has the advantageous combination of ready extrudability of 190° C. (thus being well below the 220° C. extruding temperature of some prior art postchlorinated PVC type resins) a Vicat temperature above 100°, advantageous thermal stability at 190° C., and a thermal decomposition temperature above 210° C. Articles made from suitable grades of the chlorinated resin can be sterilized in steam. The remarkable combination of easy extrudability at a sufficiently low temperature and a high Vicat temperature (at least 100° C. and desirably above 130° C.) gives these postchlorinated resins advantages over previous postchlorinated PVC type materials. Said combination of properties also provides the clue indicating the high ratio of (CHClCHCl)/($CCl_2CH_2$), which high ratio is further proven by other measurements. The Vicat temperature of the chlorinated resins is above 100° C. and usually more than 30° higher than the unchlorinated resin. The isobutene or vinyl alkyl ether groups may be at least partially chlorinated, and thus contribute to the combination of outstanding thermal stability, easy extrudability at 190° C., and a Vicat temperature above 100° C., but the advantageous combination of properties is believed to be significantly attributable to the high ratio of (CHClCHCl) to (CCl$_2$CH$_2$) achieved by the directive influence of the (CQYCH$_2$) groups upon the chlorination of the (CH$_2$CHCl) groups. Such directive influence is indicated by nuclear magnetic resonance measurements of the hydrogens, permitting calculations of the proportions of H in CH$_2$ groups, H in CHCl groups, and H in CH$_3$ groups. The increase in the proportion of H measurable in CHCl groups and/or the decrease in proportion of H measurable in CH$_2$ groups corresponds to that indicating significant selectivity for $r$ and formation of fewer $q$ groups than predicted by random distribution.

The starting material can be represented by:

in which $m+n=p$, in which $n$ is sufficiently less than 10% of $p$ that the vinyl chloride constitutes at least 90 weight percent of the copolymer. In the representation, Y is methyl or hydrogen; Q is CH$_3$ if Y is CH$_3$; Q is OR if Y is H, the R being an alkyl group having less than 20 carbon atoms, any chlorine substituents on the R or methyl groups not impairing the R or methyl terminology, so that partially chlorinated alkyl groups and unchlorinated alkyl groups are both within the definition of R. The molecular weight of the copolymer is within the 10,000–50,000 range, the molecular weight being determined by membrane osmometry measurements. Such molecular weight range is designated satisfactorily by a 150–750 range for $p$, the molecular weight of Q (from about 15 to 283) affecting the narrowness of the 150–750 designation while keeping within the 10,000–50,000 molecular weight range.

The products can be designated as

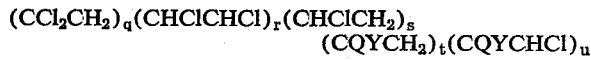

in which $q+r+s+t+u=v$ and in which $v$ is usually about equal to $p$ and the 150–750 range. The Q and Y are defined as in the starting material. Molecular weights of products are larger than for the starting material. The copolymer requirement for 90–98% vinyl chloride and 2–10% isobutylene or vinyl ether are arbitrarily expressed by noting that $t+u/v$ approximates 0.02–0.10. The degree of substitution is 0.3–0.8 so that $s$ is 0.7–0.2$m$ and $t$ is usually more than 0.7–0.2$n$.

Postchlorinated PVC type materials having a high proportion of —CCl$_2$CH$_2$— groups are known to undergo transitions below 100° C. which impart low Vicat temperatures and/or low heat distortion temperatures to such resins. Some unchlorinated PVC homopolymer resins of the 10,000–50,000 M.W. range also have Vicat temperatures below 100° C. The product resins of the present invention not merely achieve a Vicat above 100° C. but also are readily extrudable at 190° C. Such ready extrudability is established by preparing a composition having proportions of 2 parts of organo-tin sulfide (e.g. ADVASTAB–TM–180) 1 part organo-tin mercaptide (e.g. ADVASTAB–TM–918) per 100 parts of postchlorinated resin, and using a 40 g. sample, and measuring a torque within the range from 500 to 2300 meter grams at 190° C. in a Brabender test using a No. 6 roller head and corresponding bowl, and a speed adjustment of 30 r.p.m.

DESCRIPTION OF DRAWING

As shown in the accompanying drawing, a fluidizable reaction system 10 comprises a zone 11 in which a controlled batch of fluidized particles of organic plastic are supported in an up-flowing stream of gas containing chlorine, hydrogen chloride, and any diluents supplementing the diluent function of the hydrogen chloride. The gas velocity is such that in disengagement zone 12 substantially all of the particles fall back into the fluidized bed 11. A reactor shell 13 includes an outlet conduit 14 detachably connected to conduit 15 through which gas is directed into a cyclone 16 adapted to remove substantially all of the trace amounts of entrained solids. The thus separated powder is withdrawn from the cyclone through a solids withdrawal system 17. The particle-free gas stream from cyclone 16 is deemed the effluent gas stream 18 from the fluidized bed 11.

In the single bed system of the drawing, a by-pass stream in conduit 19 joins said effluent gas stream 18 to provide the input through conduit 20 to a pump 21. The pressurized gas stream from pump 21 flows through conduit 22 to a reservoir 23 having a principal outlet to conduit 24.

It should be noted that a moisture trap 25 containing molecular sieves (e.g. pellets of Zeolite A, pellets of sodium faujasite, pellets of sodium phillipsite, or the like) is adapted to sorb moisture from the gas stream in conduit 24. Chlorine and hydrogen chloride circulate in a closed path in which only minor amounts of oxygen and/or water would initially be present and/or tend to accumulate. However, the disadvantageous effect of trace amounts of water and/or oxygen was discovered to be significant during the development of the present invention. Some of the oxygen may react with the resin and/or HCl to provide water, which can be selectively removed. The advantageously high speeds of chlorinating resin to a D.S. above 0.3 are believed to be attributable in part to the use as a fluidizing gas of a gas stream previously drastically dried by treatment with molecular sieve desiccants. The drastic drying also minimizes agglomeration of the fluidizable particles, minimizes problems connected with operation of valves, pumps, and the like, and minimizes corrosion problems.

The dried gas flows through conduit 26 to provide an inlet gas stream 27 with a by-pass conduit 28 directing a gas stream to by-pass conduit 19 through a valve 29. The regulation of the valve 29 regulates the by-pass rate and thus controls the rate at which the pump 20 directs the gas stream upwardly through the fluidizable zone 11. The reactor shell 13 includes a detachable inlet conduit 30 by which the inlet gas stream 27 enters the reactor. A flow meter 31 provides a reliable measurement of the rate of gas through the fluidizable zone 11.

Within reactor shell 13 is a diffusion plate 32 consisting of a fritted glass filter and adapted to distribute the inlet gas stream 27 for uniform cross-sectional flow through the fluidizable particles 33 undergoing the postchlorination reaction.

Particular attention is directed to the feature whereby the temperature of the fluidizable zone 11 is controlled to a significant extent by the temperature of light filtering liquid flowing in the generally annular zone between inner and outer cylindrical walls 35, 36 of a condenser 37 extending into the fluidizable zone 11. A 450-watt medium pressure ultra-violet lamp 38 energized by sources of electrical power 39, 40 provides illumination of the fluidizable zone 11, the solution in the condenser functioning to filter and absorb as heat a significant portion of the radiation not having a wave length effective in dissociating chlorine molecules into active chlorine atoms.

The light-filtering solution is an aqueous solution of potassium nitrite, sodium nitrite, or other nitrite salt of an alkali metal in a concentration which is safely less than saturation, desirably about 5 to about 20% by weight of said alkaline nitrite salt. Methanol can be included in the light-filtering solution, whereby the freezing point of the solution is lowered, but should be less than about 50% by weight of the solvent. Other anti-freeze agents, if transparent to UV light, may be substituted for the methanol.

The aqueous solution of the nitrite salt permits passage of a high intensity of light of 4358 Angstroms wave length from the medium pressure mercury vapor lamp. Such 4358 Angstrom wave length light is effective in photo-activation of the chlorine in the fluidized chlorination zone. The filtered light provides $2 \times 10^{19}$ quanta per second, and the chlorine consumption rate generally corresponds to about $1 \times 10^{19}$ quanta per second, thus establishing an acceptable range of photochemical efficiency.

A cap 42 for the reactor 13 can include a flange 43 engaged with lower flange 44. The condenser 37 can be secured to the cap 42, as is the lamp 38 providing the illumination.

It should be especially noted that the light-filtering solution of nitrite salt of an alkali metal serves also as a heat transfer liquid. A tube 45 can conduct the effluent filtering liquid from an effluent conduit 46 on cap 42 through a pump 47 to a reservoir 48. The light-filtering liquid from the reservoir 48 can flow through a heating means 49 and/or cooling means 50 through conduits 51 and 52, respectively. Valves 53, 54 control the proportions of the solution subjected to heating and/or cooling before flowing by tube 55 to an inlet conduit 56 on cap 42. When no gas is flowing and the reactor is at atmospheric pressure, the cap 42 and associated structure can be removed to achieve ready access to the fluidizable particles 33 deposited on the porous plate 32 when the flow of gas was terminated.

In the operation of the method of the present invention, a batch of powdered organic polymer is placed on the diffusion plate 32 before the apparatus is assembled. The fluidizable zone 11, reservoir 23, and associated zones are evacuated by opening a valve 57 to a vacuum pump 58. Thus the system is substantially purged of moisture and oxygen. If desired, a supply of dry hydrogen chloride diluent can flow into the system 10. A controlled amount of dry chlorine is directed to flow from a tank 59 through a pressure regulator 60 and valve 61 into the system 10 to restore the system to approximately atmospheric pressure.

In batch operation, the chlorine content of the circulating gas can be measured intermittently, and the concentration can be readjusted as soon as the chlorine content is undesirably low. A portion of the gas may be withdrawn through the vacuum pump and then the pressure can be restored by additional chlorine. Thus the chlorine concentration can be maintained between suitable upper and lower limits (e.g. between about 50% and about 75%) during the several hours required for increasing the D.S. to from about 0.3 to about 0.8.

The described apparatus is merely illustrative of a suitable means for bringing about the chlorination of plastic particles in a fluidized bed. Various modifications could be made to achieve the varieties of controls deemed expedient by engineers conducting a reaction between an up-flowing gas stream and a reactive solid in a fluidized bed.

A series of fluidized zones 11 can be interconnected so that an effluent stream 18 from one reactor can be directed through an interstage pump to serve as an inlet gas stream 27 of an adjacent fluidized bed, with the chlorine gas being supplied to the bed in which the reaction is nearly completed, and with the nearly pure hydrogen chloride being withdrawn from the fluidized bed containing the freshest resin. That is, gas flow is countercurrent to the progress of the postchlorination in the series of interconnected reactors. Temperatures in each reactor are controlled to correctly program each batch to be cooled to within the 20–40° C. range until the degree of substitution is about 0.3, to use intermediate temperatures such as 40–95° C. for intermediate degrees of substitution, and to employ higher temperatures, such as 95° C. for accelerating the stages of postchlorination of a batch which approach the desired D.S. The gas supply and gas withdrawal connections are periodically shifted as there is a rotation of the shutdown, emptying, reloading, and startup of the reactors temporarily isolated from the interconnected series of reactors. Such semi-continuous processing in the interconnected series of fluidized reactors, with the gas flowing countercurrently to the progress of the reaction, has certain simplifications and is within the general scope of the drawing. Under appropriate conditions, a conventional cascade of interconnected fluidized reactors, with continuous flow of fluidized particles between reactors, can be employed.

DESCRIPTION OF EMBODIMENTS

The invention is further clarified by reference to a plurality of examples.

EXAMPLES 1–6

Copolymers of vinyl chloride and isobutylene tend to have relatively low molecular weights, the $C_4H_8$ (isobutylene) partaking of the nature of a chain stopper. It is feasible to prepare copolymers of vinyl chloride and isobutylene within the 10,000–50,000 molecular weight range required by the present invention. Molecular weights were measured by the membrane osmometry method. The starting materials and their characteristics were noted as follows:

| Code | Percent $C_4H_8$ | Molecular weight |
|---|---|---|
| A | 2.5 | 21,570 |
| C | 6.7 | 13,878 |
| D | 6.4 | 15,784 |
| F | 4.5 | 26,669 |

Using the previously described apparatus, selected copolymers of isobutene and vinyl chloride were subjected to light and chlorination to form chlorinated products. In each case the starting material was initially chlorinated at about room temperature. After the initial exotherm problems had been alleviated and after the Degree of Substitution had exceeded 0.3, the temperature was increased. Raw materials and compositions having less than 0.3 D.S. are coded by letters instead of example numbers, as set forth in the two parts of the table:

| Example | Resin code | Degree of substitution | Elemental analysis | | | NMR spectral observations fractional portion of total H as H in groups | | | Vicat, ° C. |
|---|---|---|---|---|---|---|---|---|---|
| | | | C | H | Cl | —CHCl— | —CH$_2$— | —CH$_3$— | |
| A | A | 0 | 39.4 | 5.00 | 55.3 | 0.331 | 0.63 | 0.04 | 84 |
| B | A | 0.12 | 34.3 | 4.05 | 57.5 | 0.31 | 0.65 | 0.031 | |
| 1 | A | 0.48 | 30.10 | 3.15 | 64.35 | 0.47 | 0.53 | | |
| 2 | A | 0.53 | 27.83 | 2.75 | 65.0 | 0.518 | 0.482 | | 109.5 |
| 3 | A | 0.63 | 27.0 | 2.66 | 66.5 | 0.576 | 0.424 | | 107.5 |
| C | C | 0.00 | 40.8 | 5.40 | 52.8 | 0.253 | 0.622 | 0.125 | |
| 4 | C | 0.32 | 33.25 | 3.86 | 60.8 | 0.387 | 0.531 | | |
| D | D | 0.00 | 41.4 | 5.41 | 53.2 | 0.287 | 0.60 | 0.11 | |
| E | D | 0.22 | 32.4 | 3.81 | 58.3 | 0.422 | 0.498 | 0.085 | |
| F | F | 0.00 | 40.50 | 5.25 | 54.21 | 0.278 | 0.63 | 0.0837 | 84 |
| 5 | F | 0.55 | 29.10 | 3.05 | 64.75 | 0.555 | 0.445 | | 127 |
| 6 | F | 0.70 | 28.27 | 3.00 | 67.0 | | | | 129 |

Selected unstabilized samples of the products and controls were subjected to differential thermal analysis to measure transition temperatures as follows:

A: −66°, 77°, 84°, 218° C.
1: 184° C.
2: 176° C.
3: −57°, 188°, 225° C.
4: −37°, 232° C.
D: 73°, 150°, 186°, 235° C.
E: −30°, 78°, 179°, 229° C.
F: −66°, 77°, 84°, 218° C.
5: 172°, 235° C.
6: 176°, 235° C.

The suitability of stabilized compositions for molding, extrusion, or other shaping at about 190° C. was evaluated in a plastometer. A Brabender instrument measured the torque required for masticating a controlled amount of the composition at 187° C. The meter-grams of power required to stir the material can be measured only after the particles have fluxed into a plastic mass. Such variations in the power required are indicative of variations in viscosity at shear conditions. Such viscosity measurements in standard apparatus indicate what materials appear suitable for extrusion, molding, or other shaping at that temperature. In some cases the torque measurements are made to determine what temperature would be an appropriate temperature for extrusion.

By a series of tests it is established that a composition is readily extrudable at a temperature at which the torque value is within a range from about 500 to 2300 meter-grams when using the following test conditions: No. 6 roller head for Brabender instrument and corresponding bowl; speed adjustment at 30 revolutions per minute; 40 grams of organic material per test; and formulation of the composition to have proportions of 2 parts or organo-tin sulfide (e.g. ADVASTAB–TM–180), 1 part of organo-tin mercaptide (e.g. ADVASTB–TM–918) and 100 parts of postchlorinated resin. Best results are obtained using compositions having torque values within the 1000–1600 meter-gram range. Observations showed that 187° C., the postchlorinated copolymers of the present invention were within the desired torque value:

| Example: | Torque value meter-gm. |
| --- | --- |
| 1 | 1500 |
| 2 | 1500 |
| 3 | 1500 |
| 6 | 2000 |

Such results were significantly superior to the results obtained with commercially available products known to be postchlorinated homopolymers of PVC (i.e. polyvinylchloride), which required a temperature of 218° C. to obtain torque values within the 500–2300 meter-gram range. Postchlorinated polyvinylchloride type materials undergo thermal decomposition at temperatures above about 200° C., evolve HCl, and cross-link to form compositions having higher torque value and higher viscosity. Thermal decomposition rates are influenced by the presence of stabilizers, pressure, duration at the elevated temperature and other factors. Postchlorinated PVC type materials have had a limited market partly because of the inherent conflict between the rate of thermal decomposition temperature and the ease of extrusion, and the apparently necessary overlap of temperature ranges. The present invention is a significant breakthrough by affording a margin of safety for a composition between a temperature of ready extrudability and the temperature of thermal decomposition. Thus the postchlorinated copolymers of the present invention more closely attain desired combinations of thermal decomposition temperature characteristics and extrusion temperature characteristics than do the commercially available postchlorinated homopolymers.

The postchlorinated copolymers of the present invention have a commercially acceptable degree of thermal stability at temperatures at least 10° C. hotter than extrusion temperature. Some of the postchlorinated homopolymers of vinyl chloride have been sufficiently unstable to char, exhibit increased torque values, and otherwise evidence decomposition when maintained for one hour at 200° C. Such stabilized postchlorinated homopolymer compositions have been extruded at costly conditions at 220–230° C. but the operating costs and technical difficulties of such extrusions have been objectionable.

Structural strength of articles molded from the postchlorinated copolymers of the present invention is generally maintained throughout a range extending at least from 5° to 80° C. Softening points were measured by the Vicat procedure of ASTM D–1525. The Vicat temperature of softening is tested more simply and less ambiguously than the tests for indicating structural strength throughout the 5–105° C. range.

The term "steam-sterilizable" is employed to connote an advantageously high softening temperature even for articles which users would not seek to steam-treat for sterilization or other reasons. Each of Examples 1–6 provides a postchlorinated copolymer having a Vicat softening point above 100° C. and thus has important advantages over materials softening at a temperature measurably below 100° C.

The NMR (Nuclear Magnetic Resonance) measurements concern the hydrogen in C—H bonds for distinguishing between $CH_2$ and $CHCl$ groups. In evaluating the NMR data for Example 5, it is noted that 0.445 fraction of the H is in $CH_2$ groups and 0.555 fraction of the H is in $CHCl$ groups. The data can be interpreted by ignoring the 4.5% isobutylene content and evaluating the chlorination of the PVC portion of the copolymer at a 0.55 D.S. according to the equation

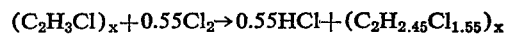

this portion of the product also being described as

in which $s/q+r+s$ is 0.45. If the reaction were 100% selective for $q$, the H of $CH_2$ groups would be 2.00/2.45 or 0.816 and the H of $CHCl$ groups would be 0.45/2.45 or 0.184. If the reaction were random, with each of the 3 hydrogens having an equal probability of being chlorinated, then the H of $CH_2$ groups would be 1.266/2.45 or 0.517 and the H of $CHCl$ groups would be 1.884/2.45 or 0.483. If the reaction were 100% selective for $r$, then the H of $CH_2$ groups would be 0.90/2.45 or 0.367 and the H of $CHCl$ groups would be 1.55/2.45 or 0.633. Inasmuch as the observed 0.445 value of H in $CH_2$ of Example 5 is intermediate the 0.367 value for 100% selectivity for $r$ and the 0.517 value of random chlorination, and inasmuch as the observed 0.555 value for H in $CHCl$ of Example 5 is between the 0.633 value for 100% selectivity for $r$ and the 0.483 value of random chlorination, the NMR data buttress the other evidence establishing significant selectivity for $r$. By a series of measurements, it is established that in the postchlorination of the copolymers in accordance with the present invention, the formation of $r$ is consistently more favored than would be expected from random chlorination. The bulkiness of the Q group might impart directiveness to the chlorination reaction, but the advantageous properties of the product are the significant advance without regard to any explanation of the selectivity of the chlorination.

EXAMPLES 7–12

Selected copolymers of vinyl ether and vinyl chloride were radiated and chlorinated in the previously described apparatus. The temperature was controlled to be approximately room temperature during the initial highly exothermic chlorination, and after the degree of substitution (D.S.) was about 0.3 the temperature was adjusted to be about 60° C. The degree of substitution was calculated from the chlorine content of the product. Lauryl vinyl ether, designated as LrOCH=CH$_2$, can be copolymerized with vinyl chloride to provide a copolymer (3% vinyl ether–97% vinyl chloride proportions) having useful properties. Other vinyl ethers, such as the methyl, ethyl, pentyl, 2-ethyl hexyl, decyl, and hexadecyl ethers of vinyl alcohol can serve as comonomers in copolymers of vinyl chloride. Several such copolymers have been described in the literature. After chlorination of such copolymers, the products have the advantageous combination that the composition can be readily extruded at 190° C., well below the temperature at which auto-catalytic decomposition occurs and that articles are not heat distorted at 100° C. Each copolymer, prior to postchlorination, had a molecular weight in the 10,000–50,000 range, as measured by membrane osmometry. The results of the postchlorination are set forth in the following table.

previous example. A suitable formulation for production of an extruded pipe consists of:

|  | Parts |
|---|---|
| Example 5 postchlorinated copolymer | 100 |
| Tribasic lead sulfate | 3.5 |
| Dibasic lead stearate | 1.0 |
| Polyethylene (mol. wt. about 1800) | 1.0 |
| Cadmium-barium complex stabilizer | 1.0 |
| Organic tin stabilizer | 1.0 |
| Ethylene/vinyl acetate copolymer | 5.0 |

The extruded pipe is of commercially acceptable quality. Other modifiers can be employed in an extrudable composition featuring the postchlorinated copolymers of the present invention and those set forth merely illustrate an example.

Articles such as pipe fittings are produced by injection molding of articles from a composition consisting of:

VINYL CHLORIDE-VINYL ETHER COPOLYMER POSTCHLORINATION TABLE

| Example | R group | Percent ether | Percent Cl | D.S. | Frac. areas —CHCl— | CH$_2$ | CH$_3$ | Vicat, ° C |
|---|---|---|---|---|---|---|---|---|
| G | Lauryl | 3 | 53.96 | 0.0 | 0.296 | 0.641 | 0.063 |  |
| H | do | 3 | 56.47 | 0.13 | 0.292 | 0.679 | 0.028 |  |
| 7 | do | 3 | 61.33 | 0.42 | 0.46 | 0.54 |  | 1.06 |
| 8 | Ethyl | 2 | 62.16 | 0.33 | 0.40 | 0.60 |  | 116 |
| 9 | do | 8 | 60.2 | 0.35 | 0.43 | 0.57 |  |  |
| 10 | n-Butyl | 6 | 59.77 | 0.3 |  |  |  |  |
| 11 | Iso-octyl | 2 | 60.55 | 0.35 | 0.49 | 0.51 |  |  |
| 12 | Decyl | 2 | 61.74 | 0.4 | 0.424 | 0.576 |  |  |
| J | do | 3 | 57.2 | 0.18 |  |  |  | 88 |

The postchlorinated copolymers have the advantageous combination of a Vicat temperature above 100° C. and easy extrudability at 190° C. Each of the postchlorinated resins of Examples 7–12, when tested as a stabilized composition at 187° C. using a No. 6 roller at 30 r.p.m. in a Brabender instrument, has a torque value within the 500–2300 meter-gram range. Moreover the products of Examples 7–12 have many of the other advantages discussed in connection with Examples 1–6.

EXAMPLE 13

A copolymer (about 35,000 molecular weight by membrane osmometry) of methyl vinyl ether (9%) and vinyl chloride is chlorinated to provide a D.S. (Degree of Substitution) of 0.6, and has the advantageous combination of easy extrudability (Brabender torque within the 500–2300 meter-gram range) at 190° C. and a Vicat temperature above 100° C.

By a series of tests it is established that the D.S. should be within the range from 0.3 to 0.8. The copolymer should, on a weight basis, contain from 2 to 10% vinyl alkyl ether or isobutylene. Some postchlorinated homopolymers of PVC have the disadvantage that the temperature at which they can be extruded is about 220° C. Between 190° C. and 220° C., the postchlorinated homopolymer tends to undergo thermal decomposition even when stabilizers are employed, so that short heating cycles must be employed. However, the postchlorinated copolymers of the present invention are readily extrudable at 190° C. and thus do not require such extreme care during extrusion.

EXAMPLE 14

Articles are produced using a postchlorinated copolymer prepared in accordance with this invention and a

|  | Parts |
|---|---|
| Example 7 postchlorinated copolymer | 100 |
| Tribasic lead sulfate | 3.5 |
| Dibasic lead stearate | 1.5 |
| Polyethylene | 1.0 |
| Cadmium-barium complex | 1.0 |
| Organic tin stabilizer | 1.0 |
| Butyl stearate | 2.0 |
| Ethylene/vinyl acetate copolymer | 5.0 |

The molded article is of commercially acceptable quality. The significant novelty concerns the postchlorinated copolymer, and any commercially acceptable blend of modifiers may be employed.

EXAMPLE 15

Fluidizable plastic particles are postchlorinated in a plurality of fluidized chlorination zones, and the chlorine-containing gas is directed through the several chlorination zones countercurrently to the degree of chlorination of the particles. The fluidizable plastic particles are programmed so that as the D.S. increases in successive stages, the fluidizing gas is hotter and more concentrated. In the first stage of chlorination, the particles are subjected to a mixture of hydrogen chloride and chlorine at a temperature controlled to be about room temperature such as 20° C. Each of the first few stages of chlorination desirably has a residence time, chlorine concentration, temperature, and other controlled conditions which are adjusted to avoid a difference of more than about 20°, desirably only about 5° C., between the temperatures of the inlet stream and outlet stream of gas.

A temperature such as 95° C. would be damaging in the initial stages of the reaction, at which the fluidizable resin particles could fuse with each other. After an adequate degree of substitution of chlorine (e.g. above about 0.4) the fluidized particles can withstand temperatures near 95° C. without troublesome fusion problems. If the stage of fluidized chlorination conducted at a temperature of about 60° C. has a residence time of more than about 30 minutes, then it is ordinarily safe to conduct the further chlorination at temperatures increasing from about 65° C. up to about 95° C.

Lamps provide the radiation for promoting the dissociation of chlorine. Particular attention is directed to the feature of using a circulating light-filtering aqueous solution of a nitrite salt of an alkali metal to help control the temperature of each stage of chlorination.

The fluidizing gas in the last stage is desirably drastically dried (e.g. via a molecular sieve such as sodium phillipsite, sodium faujasite, or Zeolite A) chlorine. Gas flow amongst the chlorination zones is desirably countercurrent to the increasing degree of substitution in the fluidized particles, and the interstage gas flow can be described as through a cascade of reactors, even though the particles remain in a single reactor during the complete chlorination of a batch. Automated valving can be a feature of the rotational control of the counterflow of the fluidizing gas through the interconnected chlorination zones. If desired, conventional cascades of fluidized reactors with particles flowing continuously between reactors, may also be employed, whereby a stream of the postchlorinated plastic particles can be withdrawn continuously from the final stage at a rate corresponding to the rate of introduction of plastic particles to the first stage. In the latter stages of treatment, the chlorine concentration can be significantly increased, thereby speeding up the attainment of an adequate degree of substitution. The preferred range of degree of substitution is from about 0.4 to about 0.65, but useful products are within the wider 0.3 to 0.8 D.S. range. About 3 hours total residence time of particles in the fluidized chlorination zone(s) provides the preferred degree of substitution.

The method and apparatus featuring a circulating temperature controlled solution of such nitrite salt are employed for the postchlorination of any suitable fluidizable plastic (i.e. organic polymer). Particularly significant advantages are achieved by controlling the temperature within each stage of the successive chlorination steps by various temperature regulating techniques including the flow of the liquid containing the nitrite salt in each of the chlorination zones. Thus it is feasible to employ a low temperature and rapid cooling in the initial stages of the postchlorination of the fluidizable plastic powder and to employ an elevated temperature such as 95° for the aqueous solution of the nitrite salt in the final stage, whereby more chlorination occurs and a higher degree of substitution is attained. Such use of the aqueous solution of nitrite salt for achieving both the filtration of the light and the heat transfer from the fluidized zone overcomes certain long-standing problems connected with temperature control and radiation wave-length control in the chlorination of organic polymers.

It should be especially noted that the fluidizing gas is exhaustively dried by passage through molecular sieve desiccants such as sodium faujasite (Zeolite Y) or Zeolite A, whereby traces of moisture are removed. It is established that a mixture of hydrogen chloride and chlorine recirculating through one or more chlorination zones tends to accumulate moisture as a result of the trace amounts of water sorbed upon the fluidizable particles. The speed with which the plastic particles can be postchlorinated to a D.S. (Degree of Substitution) of at least 0.3 is believed to be significantly curtailed by the presence of such trace amount of moisture in the fluidizing gas, so that the drastic drying with molecular sieve desiccants achieves a plurality of advantages including a faster reaction rate.

The invention claimed is:
1. Chlorinated copolymeric material characterized as

$$(CCl_2CH_2)_q(CHClCHCl)_r(CHClCH_2)_s$$
$$(CQYCH_2)_t(CQYCHCl)_u$$

in which $q+r+s+t+u=v$, in which $q+r+u/v$ is from 0.3 to about 0.8, $u+t/v$ approximates 0.02–0.10, Y is methyl or hydrogen, Q is methyl if Y is methyl, Q is OR if Y is hydrogen, the R being an alkyl group having less than 20 carbon atoms, said chlorinated copolymeric material having a torque value at 190° C. within a range from about 50 to about 2300 meter-grams, and said chlorinated copolymeric material having a Vicat temperature above 100° C.

2. Chlorinated copolymer material of claim 1 in which $CQYCH_2$ is isobutene.

3. Chlorinated copolymeric material of claim 1 in which $CQYCH_2$ is a vinyl ether.

4. A shaped article consisting of a minor amount of blend of modifiers and a predominant amount of the copolymeric material of claim 1.

5. Copolymeric material of claim 1 having a Vicat temperature above 120° C.

6. Copolymeric material of claim 1 in which $q+r+u/v$ is 0.4 to 0.65.

7. A method of preparing chlorinated copolymeric material of claim 1 includes the steps of:
   forming a fluidized bed of particles of copolymeric material derived from a predominant amount of vinyl chloride and a minor amount of a comonomer, said bed featuring an up-flowing stream of gas previously drastically dried by passage through a zone containing molecular sieve desiccants;
   introducing dry chlorine into said dried gas stream so that the fluidized bed serves as a fluidized chlorination zone;
   subjecting the fluidized bed to light which activates the chlorine;
   controlling the temperature of the fluidized chlorination zone by flow of a stream of an aqueous solution of a nitrite salt of an alkali metal in a concentration within the range from about 5% to about 20%, said solution being transparent to light waves which activate chlorine but significantly opaque to wide bands of other light waves, said stream of aqueous solution flowing in a light-filtering zone positioned between the source of said light and the fluidized chlorination zone;
   controlling the temperature of the chlorination zone by indirect heat exchange with said aqueous solution to provide a temperature near 20° C. during the chlorination of particles having a degree of substitution near zero and to provide a temperature near 95° C. during the chlorination of particles having a degree of substitution greater than about 0.5; and
   withdrawing, as product of the reaction, the particles of the chlorinated polymeric material of claim 1.

8. The method of claim 7 in which a plurality of fluidized chlorination zones are interconnected so that the inlet gas stream for an intermediate chlorination zone is the effluent gas stream from another intermediate chlorination zone, the interstage gas flow being countercurrent to the increasing degree of substitution in the several chlorination zones.

9. The method of preparing chlorinated organic polymeric material which includes the steps of:
   forming a fluidized bed of particles of organic polymeric material in an up-flowing stream of fluidizing gas previously drastically dried; introducing dry chlorine into said dried gas stream so that the fluidized bed serves as a fluidized chlorination zone; subjecting the fluidized bed to light which activates the chlorine; controlling the temperature of the fluidized chlorination zone by flow of a stream of an aqueous solution of a nitrite salt of an alkali metal in a concentration within the range from about 5% to about 20%, said solution being transparent to light waves which activate chlorine but significantly filtering out wide bands of other light waves, said stream flowing in a light-filtering zone positioned between the source of illumination and the fluidized chlorination zone; controlling the temperature of the chlorination zone by indirect exchange with said aqueous solution to provide a temperature near 20° C. during the chlorination of particles having a degree of substitution near zero and to provide a temperature near 95° C. during the chlorination of particles having a degree of substitution greater than about 0.5; and withdrawing, as product of the reaction, chlorinated polymeric particles.

10. The method in accordance with claim 9 in which the fluidizing gas is drastically dried by passage through a zone containing molecular sieve desiccants.

References Cited
UNITED STATES PATENTS 2,590,651  3/1952  Rosenberg _____ 204—159.18

JAMES A. SEIDLECK, Primary Examiner

J. A. DONAHUE, Jr., Assistant Examiner

U.S. Cl. X.R.

204—159.18; 260—87.5 G